United States Patent
Blitz et al.

(10) Patent No.: US 7,638,094 B2
(45) Date of Patent: Dec. 29, 2009

(54) METHOD FOR THE CONTINUOUS PRODUCTION OF MELT POLYMERS IN A TUBULAR REACTOR

(75) Inventors: Hans-Dieter Blitz, Darmstadt (DE); Norbert Suetterlin, Muehltal-Nieder-Beerbach (DE)

(73) Assignee: Roehm GmbH & Co. KG, Darmstadt (DE)

( * ) Notice: Subject to any disclaimer, the term of this patent is extended or adjusted under 35 U.S.C. 154(b) by 583 days.

(21) Appl. No.: 10/581,689

(22) PCT Filed: Nov. 4, 2004

(86) PCT No.: PCT/EP2004/012450

§ 371 (c)(1),
(2), (4) Date: Jun. 6, 2006

(87) PCT Pub. No.: WO2005/066216

PCT Pub. Date: Jul. 21, 2005

(65) Prior Publication Data

US 2007/0129512 A1  Jun. 7, 2007

(30) Foreign Application Priority Data

Jan. 9, 2004  (DE) ..................... 10 2004 001 599

(51) Int. Cl.
*G01N 33/00* (2006.01)
*B01L 3/00* (2006.01)
*B01J 19/00* (2006.01)
*C08G 85/00* (2006.01)

(52) U.S. Cl. .................. 422/68.1; 422/102; 422/130; 422/131; 526/64

(58) Field of Classification Search ............ 422/68.1, 422/102, 130, 131; 526/64
See application file for complete search history.

(56) References Cited

U.S. PATENT DOCUMENTS

2003/0035756 A1 *  2/2003  Nelson et al. .............. 422/68.1

FOREIGN PATENT DOCUMENTS

| DE | 23 32 748 | 1/1974 |
| DE | 196 38 094 | 3/1998 |
| WO | 99/23119 | 5/1999 |
| WO | 02/081079 | 10/2002 |

* cited by examiner

*Primary Examiner*—William K Cheung
(74) *Attorney, Agent, or Firm*—Oblon, Spivak, McClelland, Maier & Neustadt, L.L.P.

(57) ABSTRACT

The invention relates to a process for the continuous free-radical homogeneous solution polymerization or melt polymerization of (meth)acrylate monomer mixtures.

19 Claims, 1 Drawing Sheet

METHOD FOR THE CONTINUOUS PRODUCTION OF MELT POLYMERS IN A TUBULAR REACTOR

Figure 1:
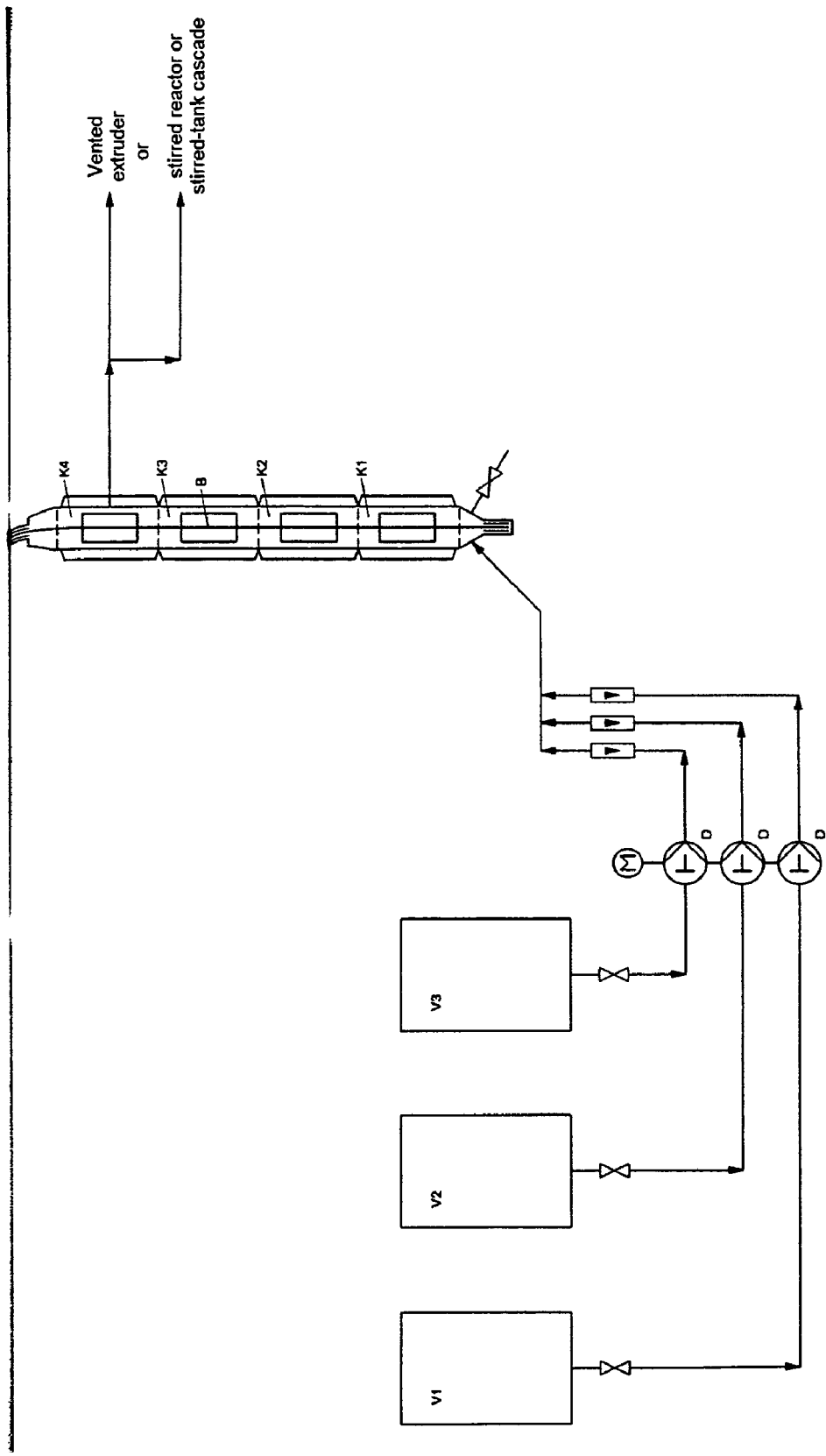

The invention relates to a process for the continuous free-radical homogeneous solution polymerization or melt polymerization of (meth)acrylate mixtures.

There is a wide variety of polymerization reactions. The best known are solution, precipitation, suspension, emulsion and bulk polymerization. All polymerization methods have advantages and disadvantages.

Bulk polymerization is a polymerization reaction in liquid or molten monomers, requiring only the addition of initiators. Bulk polymerization methods feature high space-time yields, high purity of products, and low work-up costs, because complicated removal of solvents is unnecessary. The disadvantages are viscosity increase and reaction temperature increase.

Many melt polymerization processes are known. They are mostly carried out batchwise in stirred tanks. An advantage here is the almost complete conversion of the monomers to the product. However, a disadvantage is low throughput. Every batch has to be assembled separately, and temperature and, where appropriate, pressure have to be used to initiate the reaction. Once the reaction has been completed, the stirred tank has to be emptied before a new batch can be made ready. These disadvantages are avoided by continuous conduct of the process. Tubular reactors are mostly used for this purpose. However, these in turn have lower throughputs.

DE 2332748 describes a process which can be used in the case of slow throughput of a viscous mass through a tubular reactor to achieve uniform residence time distribution. Ideally, plug flow is generated in a tubular reactor, to prevent the throughput rate in the vicinity of the wall of the tubular reactor from being significantly lower than in the middle. Varying residence times in the reactor would lead to broad molar mass distribution.

The rate at which the viscous mass is passed through the tubular reactor is generally dependent on the time needed for the reaction taking place in the reactor and on the intended degree of conversion. By way of example, in the case of a polymerization reaction the throughput rate is selected in such a way as to achieve a monomer conversion level at which a polymer with the desired properties is formed. This type of throughput is therefore different from the throughput of non-reacting liquids, e.g. of oils through pipelines. In the latter case it is important to maximize the throughput rate in order to increase throughput. In the case of transport of oils this usually leads to turbulent flow, whereas it is desirable to avoid turbulence in the case of reactions in a tubular reactor.

Another important criterion in reactor design is the viscosity of the materials in the reactor. In the case of polymerization reactions, in particular in the case of bulk polymerization methods and melt polymerization methods, very high viscosities occur. The reaction temperature also increases sharply. It is important here that the reaction proceeds at the same rate at all points within the viscous mass, thus preventing formation of localized regions of high viscosity and high conversion. These can lead to runaway reaction or blockages of the tubular reactor. DE 2332748 attempts to solve the problem. The process is characterized in that a layer composed of a relatively low-viscosity liquid is maintained between the reactor wall and the viscous mass during throughput of the viscous mass through the tubular reactor. However, a major disadvantage of the process is that back-mixing of the low-viscosity liquid with the relatively high-viscosity polymer solution produces a relatively broad molar mass distribution. Complicated chemical engineering is moreover needed in order to generate the low-viscosity liquid film at the reactor wall. To this end, the entire tubular reactor has to be rotated about its own axis.

An object was to develop a process which permits preparation of polymers or copolymers with narrow molecular weight distribution. The process should be capable of polymerizing the monomers in bulk.

The object has been achieved via a process for the continuous free-radical homogeneous solution polymerization or melt polymerization of (meth)acrylate monomer mixtures, characterized in that the monomer mixture is fed at the bottom of a tubular reactor, is heated to reaction temperature in the presence of an initiator or initiator mixture, and is stirred at from 5 to 50 rpm by a stirrer, and the molten polymer is discharged at the top of the tubular reactor. The term (meth)acrylate here means either methacrylate e.g. methyl methacrylate, ethyl methacrylate, etc. or acrylate.

Surprisingly, it has been found that in the inventive tubular reactor the monomer/monomer mixtures introduced from below generate, as conversion increases and as a result of the viscosity increase associated therewith, a uniform flow profile. The higher-conversion mixtures having relatively high viscosity form an "outer layer" on the relatively low-viscosity mixtures, the result being that very little back-mixing occurs. This leads to narrow molecular weight distribution.

The invention also provides monomer mixtures which comprise not only one or more monomers but also an initiator or initiator mixtures and a regulator or regulator mixtures, and auxiliaries and additives.

The monomers or monomer mixtures, and added materials, e.g. initiator, regulator, plasticizer, etc., may be introduced individually or in premixed form from below into the tubular reactor. In one particular embodiment, 2 or more monomer streams with the respective regulators, initiators, auxiliaries and additives may be introduced separately. A particularly preferred method introduces one monomer stream with regulators or regulator mixtures and a second monomer stream with initiators or initiator mixtures into the reactor. The starting materials may also be introduced in preheated form. The starting materials are particularly preferably preheated to about 50° C. Individual components may also be introduced by way of additional inlet apertures within the lower third of the tubular reactor.

The invention also provides polymers prepared by the inventive process. Polymers derived from melt polymerization methods are preferred. Melt polymers whose glass transition temperature is $\leq 70°$ C. are particularly preferred.

The invention also provides a tubular reactor, advantageously arranged vertically, characterized in that reactor zones can be heated separately and a centrally arranged stirrer unit operates at rotation rates of from 5 to 50 rpm. The starting materials are introduced from below, and the product is drawn off at the top of the tubular reactor, or in its upper third. Because the conversions achieved are high, the product stream may immediately be further processed by conventional processing machinery. By way of example, the material can be further processed directly to give mouldings by way of a downstream vented extruder. Residual monomers or solvent residues can be drawn off here by venting.

The product stream may optionally also be introduced into a final polymerization process in a downstream tubular reactor or stirred-tank cascades.

The viscosity of the mixtures of substances within the reactor depends on the degree of polymerization. The feeds composed of monomers and/or monomer mixtures generally have lower viscosity than the polymers, and this means that the viscosities at various points in the tubular reactor vary.

The individual segments of the inventive tubular reactor may be separately heated and cooled. By this means, the temperature control in the reactor ensures that the monomer mixtures and polymers are always liquid. The high-viscosity masses are kept flowable by way of high temperatures. The result can be high conversions.

The optimized temperature control of the viscous mass within the reactor can prevent material from adhering to the reactor wall, with resultant possible formation of blockages.

The linear velocity of the viscous mass in the longitudinal direction of the tubular reactor is less than 50 cm/sec and is usually below 5 cm/sec. In individual cases, the velocity can be of the order of tenths of one centimeter per second.

In principle, the dimensions of the reactor are of subordinate importance. However, the length:diameter ratios are important. These affect the course of the reaction, thus controlling the progress of the reaction, without excessively low or excessively high throughput rate, or uncontrollable heat exchange.

The length of the tubular reactor is from 0.5 to 100 m, in particular from 1 to 25 m. Advantageous diameters are from 0.1 to 1 m. The length:diameter ratio is preferably from 250 to 5. The ratio is preferably from 8 to 20, particularly preferably 12. The cross section of the tube is preferably circular. Perpendicularly to the direction of flow, the cross section of the tubular reactor is advantageously constant.

There is a centrally arranged stirrer in the inventive tubular reactor. The stirrer unit rotates slowly and ensures that the temperature profile in the reactor is uniform. The higher-temperature particles at the reactor wall are moved towards the reactor interior by way of the operation of the stirrer, while lower-temperature particles are conveyed towards the reactor wall. The stirring rate is from 5 to 50 rpm, preferably from 10 to 30 rpm.

The stirrer and the stirrer blades may have any desired shape. A blade stirrer is preferably used. The stirrer has preferably been arranged in the middle of the tubular reactor. In one preferred embodiment, two or more stirrer elements have been arranged mutually superposed on the stirrer shaft. The individual stirrer blades preferably have a large surface area. The result can be uniform stirrer-generated flow generated in each segment of the tubular reactor.

The design of the stirrer in the inventive tubular reactor is such that the cross section ratio of internal diameter of the tubular reactor to the diameter of the stirrer is from 1.10 to 1.90, preferably from 1.40 to 1.45. The relationship between tubular reactor dimensions and stirrer speed can be defined relatively precisely by way of the peripheral velocity. The peripheral velocity is preferably from 1 cm/s to 10 cm/s, particularly preferably 6 cm/s. These low-speed stirrers which pass close to the wall provide an ideal solution for the stirring requirements.

The residence time is another criterion. The flow rate is therefore varied, depending on the desired molar masses. High flow rates lead to short residence times and therefore to small molar masses. Short residence times also reduce monomer conversion. The inventive polymerization process provides high conversions. This is achieved via sufficiently long residence times.

In preferred embodiments, a methacrylic ester of an alcohol mixture composed of tallow fatty alcohol and C13-C18-alkyl alcohol, acrylic esters, highly refined mineral oils (e.g. Shell SM 920 oil, Telura 630 oil), where appropriate with methyl methacrylate and/or butyl methacrylate, are reacted with the appropriate initiators and regulators.

The polymers may be used as hot-melt adhesives, as viscosity index improvers or as setting-point improvers. The polymers may also be used in the form of lacquers.

FIG. 1 shows one particularly preferred embodiment of the tubular reactor which encompasses, by way of example: 4 independently controlled cooling/heating zones (K1, K2, K3, K4), blade stirrer (B) over the entire height of the reactor, metering pumps (D) and storage vessels (V1, V2, V3) for the initiator solutions and the monomer mixtures. The tubular reactor may be composed, by way of example, of 4 mutually superposed jacketed tubes. There may be caps sealing the top and bottom of the reactor. These caps may carry the connections for the feed of the monomers or initiator solutions and the discharge of product at the top. The bearings for a blade stirrer may also be inserted into the caps. The stirrer designed to pass close to the wall may, by way of example in the case of a nominal width of 100 (jacketed tube), be a blade stirrer with a width (diameter) of 80 mm and a shaft diameter of 12 mm. Additional bearing points for the stirrer are advantageous, as required by the length of the reactor.

The examples given below are provided for further illustration of the present invention, but are not intended to restrict the invention to the features disclosed herein.

EXAMPLES

Example 1

Continuous Bulk Polymerization

A mixture A composed of 234 g of a methacrylic ester, 37.5 g of butyl methacrylate, 28.5 g of methyl meth-acrylate and 6.0 g of tert-butyl 2-ethylperhexanoate (2%), and a mixture B composed of 234 g of a methacrylic ester, 37.5 g of butyl methacrylate, 28.5 g of methyl methacrylate and 0.6 g of dodecyl mercaptan (0.2%) are separately introduced into a tubular reactor ($V_R$~1.2 liters). The mixtures A and B are reacted with one another at a temperature of 125° C., a stirrer rotation rate of 20 rpm and a throughput of $0.5 \times V_R$/h. The J value for the polymer is ~47 ml/g at 97-98% conversion. The J value is measured in chloroform at 23° C. to ISO 1628 Part 6.

Examples of methods for determining the molecular weight are differential scanning calorimetry (DSC) or gel chromatography, using polymethyl methacrylate calibration standards or, respectively, calibration lines, these correlating with the viscosity number.

Example 2

Continuous Melt Polymerization

A mixture A composed of 1000 g of an acrylic ester and 20 g of dodecyl mercaptan, and a mixture B composed of 1000 g of an acrylic ester and 5 g of tert-butyl perpivalate are separately introduced into a tubular reactor ($V_R$~1.2 liters). The mixtures A and B are reacted with one another at a temperature of 125° C., a stirrer rotation rate of 18 rpm and a throughput of $2 \times V_R$/h. The molecular weight $M_W$ of the polymer is 37 000, and the J value is 11 ml/g, 80-85% conversion.

Example 3

Continuous Melt Polymerization

A mixture A composed of 485 g of an acrylic ester, 106 g of highly refined mineral oil (Shell SM 920 oil), 0.97 g of dodecyl mercaptan (0.1%), and a mixture B composed of 485 g of an acrylic ester, 106 g of highly refined mineral oil (Shell SM 920 oil) and 1.94 g of tert-butyl perpivalate (0.2%) are added separately into a tubular reactor. The mixture is reacted at a temperature of 92-94° C., a stirrer rotation rate of 19 rpm and a throughput of 1×$V_R$/h. The molecular weight $M_W$ of the polymer is 512 000 and the conversion is ~86%.

Example 4

Continuous Bulk Polymerization

A mixture composed of 578.7 g of a methacrylic ester (9.8% of methyl methacrylate), 21.3 g of methyl methacrylate (3.5%), 12.0 g of tert-butyl 2-ethylperhexanoate (2.0%) and 4.5 g of dodecyl mercaptan (0.6%) is added to a tubular reactor ($V_R$~1.2 liters). The mixture is reacted at a temperature of ~125° C., a stirrer rotation rate of 18 rpm and a throughput of 0.5×$V_R$/h. The J value of the polymer is ~23-26 ml/g and the conversion is 97%.

Example 5

Continuous Bulk Polymerization

A mixture composed of 600 g of a methacrylic ester (8.7% of methyl methacrylate), 12.0 g of tert-butyl 2-ethylperhexanoate (2.0%) and 1.5 g of dodecyl mercaptan (0.25%) is added to a tubular reactor ($V_R$~1.2 liters). The mixture is reacted at a temperature of ~125° C., a stirrer rotation rate of 20 rpm and a throughput of 0.5×$V_R$/h. The J value of the polymer is ~27 ml/g and the conversion is 97%.

Example 6

Continuous Melt Polymerization with Downstream Final Polymerization

A mixture A composed of 850 g of an acrylic ester, 34 g of dodecyl mercaptan (2%), and a mixture B composed of 850 g of an acrylic ester and 13.6 g of tert-butyl perpivalate (0.8%) are added to a tubular reactor ($V_R$~1.2 liters). The mixture is reacted at a temperature of ~125° C., a stirrer rotation rate of 19 rpm and a throughput of 1.5×$V_R$/h. The mixture is subjected to final polymerization in a downstream stirred vessel ($V_R$=1.5×$V_R$). The J value of the polymer is ~13 ml/g and the conversion is 97%.

The invention claimed is:

1. A continuous process for polymer formation, comprising:
    feeding an at least one monomer mixture into a lower third of a vertically arranged tubular reactor,
    polymerizing the at least one monomer by heating the at least one monomer mixture to reaction temperature in the presence of at least one free radical initiator to form a monomer-initiator polymerization mixture,
    moving the monomer-initiator polymerization mixture through the vertical tubular reactor at a longitudinal linear velocity of from 0.1 to 50 cm/sec,
    stirring the monomer-initiator polymerization mixture at from 5 to 50 rpm by a stirrer while moving through the vertical tubular reactor,
    controlling the polymerization mixture temperature while moving through the vertical tubular reactor,
    forming a polymer mixture, and
    discharging the polymer mixture from an upper third of the vertical tubular reactor;
    wherein
    a ratio of an internal diameter of the vertical tubular reactor to a diameter of the stirrer is in a range from 1.10 to 1.90,
    the at least one monomer mixture comprises a (meth)acrylate monomer, and
    the polymerizing is either bulk free-radical homogeneous solution polymerization, or bulk free-radical melt polymerization.

2. The process according to claim 1, wherein the polymerization mixture temperature is controlled to maintain the polymerization mixture as a liquid.

3. The process according to claim 1, wherein the at least one free radical initiator is introduced within the lower third of the vertically arranged tubular reactor.

4. The process according to claim 1, wherein the at least one monomer mixture is preheated prior to feeding to the vertical reactor.

5. The process according to claim 1, wherein the process is carried out without solvent.

6. The process according to claim 1, further comprising introducing the discharged polymer mixture to a final polymerization in a downstream tubular reactor or stirred tank cascades.

7. The process according to claim 1, wherein further processing of the polymer takes place directly in a downstream processing apparatus.

8. The process according to claim 1, wherein the at least one monomer mixture comprises two or more monomer mixtures of different composition.

9. The process according to claim 8, wherein the two or more monomer mixtures each comprise one or more monomers, a regulator or regulator mixture, at least one auxiliary, at least one additive and the at least one initiator.

10. The process according to claim 8, comprising two monomer mixtures, wherein one mixture comprises one or more monomers, the initiator or initiator mixture, at least one auxiliary and at least one additive, and
    wherein the other mixture comprises one or more monomers, the regulator or regulator mixture, at least one auxiliary and at least one additive.

11. A polymer prepared by the process of claim 1, wherein the process is a melt polymerization process, and the polymer has a glass transition temperature $\leq 70°$ C.

12. A tubular reactor for the process of claim 1, arranged vertically, comprising:
    starting material introduction in the lower third of the reactor, and
    product take-off in the upper third of the reactor,
    wherein
    the reactor comprises reactor zones, which can be heated separately,
    a centrally arranged stirrer unit operates at rotation rates of from 5 to 50 rpm, and
    a ratio of an internal diameter of the vertical tubular reactor to a diameter of the stirrer in the range from 1.10 to 1.90.

13. A polymer formed by the process of claim 1.

14. A method of forming a viscosity index improver, comprising, forming the viscosity index improver with the polymer of claim 13.

15. A method of making a setting-point improver comprising forming the setting-point improver with the polymer of claim 13.

16. A method of forming a lacquer, comprising forming the lacquer with the polymer of claim 13.

17. A method of making a hot-melt adhesive, comprising forming the hot-melt adhesive with the polymer of claim 13.

18. The process of claim 1, wherein the process is a melt polymerization process.

19. A polymer formed by the process of claim 6.

* * * * *